(12) United States Patent
Rybka et al.

(10) Patent No.: US 8,850,940 B2
(45) Date of Patent: Oct. 7, 2014

(54) INTEGRATED STAND MOUNT FOR MITER SAW

(75) Inventors: Matthew Michael Rybka, Hoffman Estates, IL (US); Garth William Prince, Mount Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 13/154,887

(22) Filed: Jun. 7, 2011

(65) Prior Publication Data

US 2012/0312140 A1    Dec. 13, 2012

(51) Int. Cl.
*B23D 47/00*    (2006.01)
*B23D 47/02*    (2006.01)

(52) U.S. Cl.
CPC .................................... *B23D 47/025* (2013.01)
USPC .................................. 83/473; 83/490; 83/581

(58) Field of Classification Search
USPC .................. 83/490, 581, 859, 473, 471.3; 248/229.1, 316.1; 144/286.1, 286.5
See application file for complete search history.

(56) References Cited

U.S. PATENT DOCUMENTS

| | | | |
|---|---|---|---|
| 4,694,720 A | 9/1987 | Brickner, Jr. et al. | |
| 4,934,423 A * | 6/1990 | Withrow | 144/286.1 |
| 5,273,090 A * | 12/1993 | Klemma | 144/136.9 |
| 5,664,612 A * | 9/1997 | Klemma | 144/286.1 |
| 5,730,434 A | 3/1998 | Schoene et al. | |
| 5,836,365 A | 11/1998 | Derecktor | |
| 5,988,243 A | 11/1999 | Ayala et al. | |
| 6,431,042 B1 | 8/2002 | Brault et al. | |
| 6,745,804 B2 * | 6/2004 | Welsh et al. | 144/287 |
| 6,944,897 B2 * | 9/2005 | Koch | 5/621 |
| 7,416,193 B1 | 8/2008 | Barnett | |
| D597,569 S | 8/2009 | Sasaki et al. | |
| 7,617,755 B2 | 11/2009 | Bean et al. | |
| 7,926,523 B2 * | 4/2011 | Williams et al. | 144/286.5 |
| 2003/0080267 A1 * | 5/2003 | Eslick | 248/229.1 |
| 2004/0232301 A1 * | 11/2004 | Bremmon et al. | 248/316.1 |
| 2004/0250903 A1 * | 12/2004 | Welsh | 144/286.5 |
| 2006/0272744 A1 | 12/2006 | Liu et al. | |
| 2007/0074611 A1 | 4/2007 | Hu | |
| 2008/0203259 A1 | 8/2008 | Harrison et al. | |
| 2009/0151816 A1 | 6/2009 | Billings et al. | |
| 2009/0301277 A1 | 12/2009 | Ipatenco et al. | |

OTHER PUBLICATIONS

International Search Report and Written Opinion in corresponding PCT Application (i.e., PCT/US2012/041351), completed Sep. 5, 2012 (10 pages).

* cited by examiner

*Primary Examiner* — Omar Flores Sanchez
(74) *Attorney, Agent, or Firm* — Maginot, Moore & Beck

(57) ABSTRACT

A miter saw for use with a miter saw stand includes a base having a first clamping surface, a second clamping surface, and a first actuator. The miter saw further includes a turntable rotatable in relation to the base and having a work piece support surface. The miter saw also includes a support assembly attached to the turntable, and a cutting assembly attached to the support assembly and positioned over the turntable. The first actuator is movable between a first position and a second position. Movement of the first actuator from the first position towards the second position causes the first clamping surface to move toward the second clamping surface.

14 Claims, 5 Drawing Sheets

INTEGRATED STAND MOUNT FOR MITER SAW

FIELD

The present disclosure relates generally to miter saws, and particularly to stand mounts for miter saws.

BACKGROUND

Miter saws are used for cutting and shaping work pieces, such as, hardwood, manufactured wood products, construction lumber, and other materials. The typical miter saw includes a base or a platform on which a turntable is positioned. The turntable and a portion of the base support a work piece to be cut by the miter saw. A support assembly of the miter saw is connected to the turntable and functions to support a cutting assembly that is operable to perform a cutting operation on the work piece. The support assembly includes components that enable the cutting assembly to move upward and downward in relation to the turntable in order to cut the work piece positioned thereon. The support assembly also typically includes components to enable the cutting assembly to pivot in relation to the turntable in order to produce beveled or angled cuts on the work piece.

Some users prefer to operate a miter saw on a portable miter saw stand. The typical miter saw stand includes ground engaging legs, which support a horizontal support section. The miter saw is positioned on the horizontal support section, such that the turntable of the miter saw is positioned at the height of a typical user's midsection. Accordingly, a miter saw stand is useful for preventing miter saw users from having to kneel or crouch to operate the saw.

In general, known miter saws are not connected directly to the miter saw stand. Instead, the miter saw is first connected to a support bracket system. The typical support bracket system includes a pair of support brackets, which are configured for attachment to the lateral ends of the base of the miter saw. Typically, the support brackets are connected to the base with various fasteners, such as threaded bolts. After the support brackets are connected to the miter saw, the miter saw is positioned on the miter saw stand, such that the support brackets are positioned to attach to the horizontal support section. Next, attachment features, such as additional threaded bolts, are used to attach each support bracket to the horizontal support section.

Known support bracket systems adequately attach the miter saw to the miter saw stand; however, known support bracket systems increase the weight of the miter saw and are time consuming to attach and remove from the miter saw. In particular, the typical support bracket system increases the mass of a miter saw by approximately three kilograms. Additionally, hand tools, such as a wrench, are usually needed to attach (and remove) the support bracket system to the base of the miter saw. At a construction site, users may consume time searching for the proper hand tools for operating the support bracket system. Therefore, it would be desirable to provide an improved system for connecting a miter saw to a miter saw stand.

SUMMARY

According to one embodiment of the present disclosure there is provided a miter saw for use with a miter saw stand. The miter saw includes a base having a first clamping surface, a second clamping surface, and a first actuator. The miter saw further includes a turntable rotatable in relation to the base and having a work piece support surface. The miter saw also includes a support assembly attached to the turntable, and a cutting assembly attached to the support assembly and positioned over the turntable. The first actuator is movable between a first position and a second position. Movement of the first actuator from the first position towards the second position causes the first clamping surface to move toward the second clamping surface.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
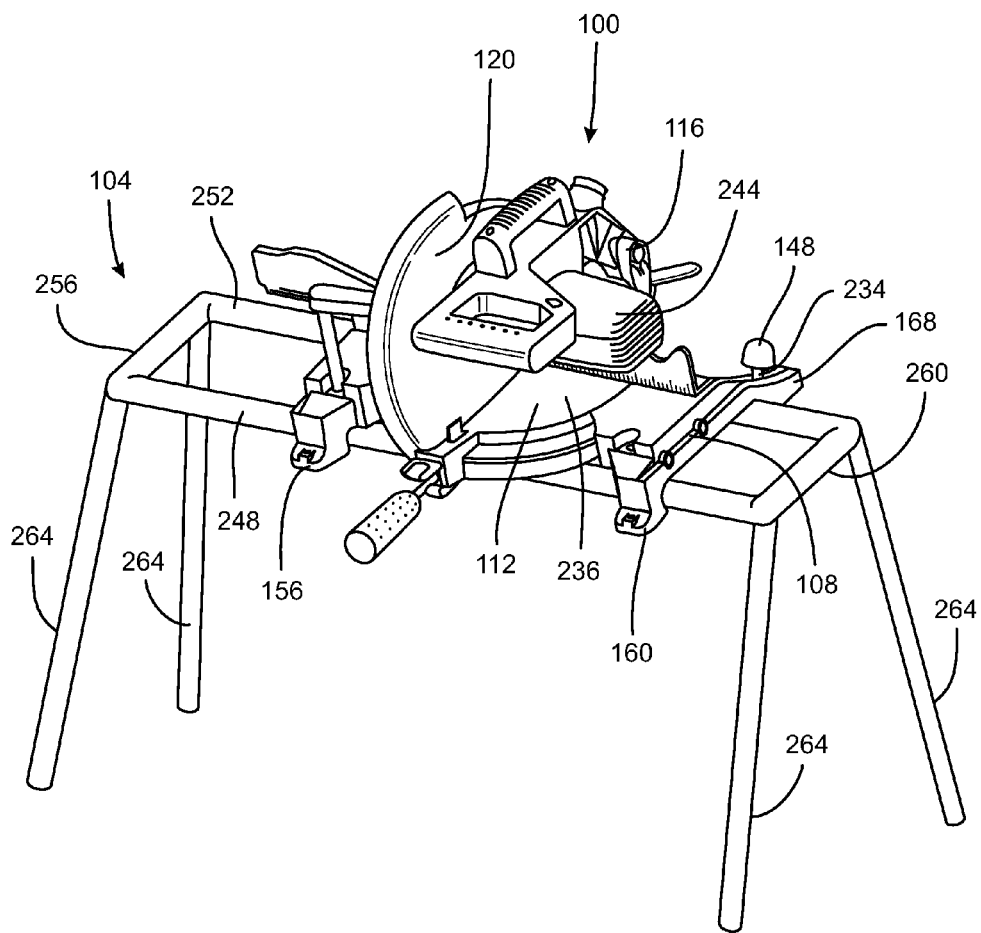
FIG. 1 is a front perspective view of a miter saw and a miter saw stand, the miter saw includes an integrated stand mount, according to the present disclosure.
Figure 2:
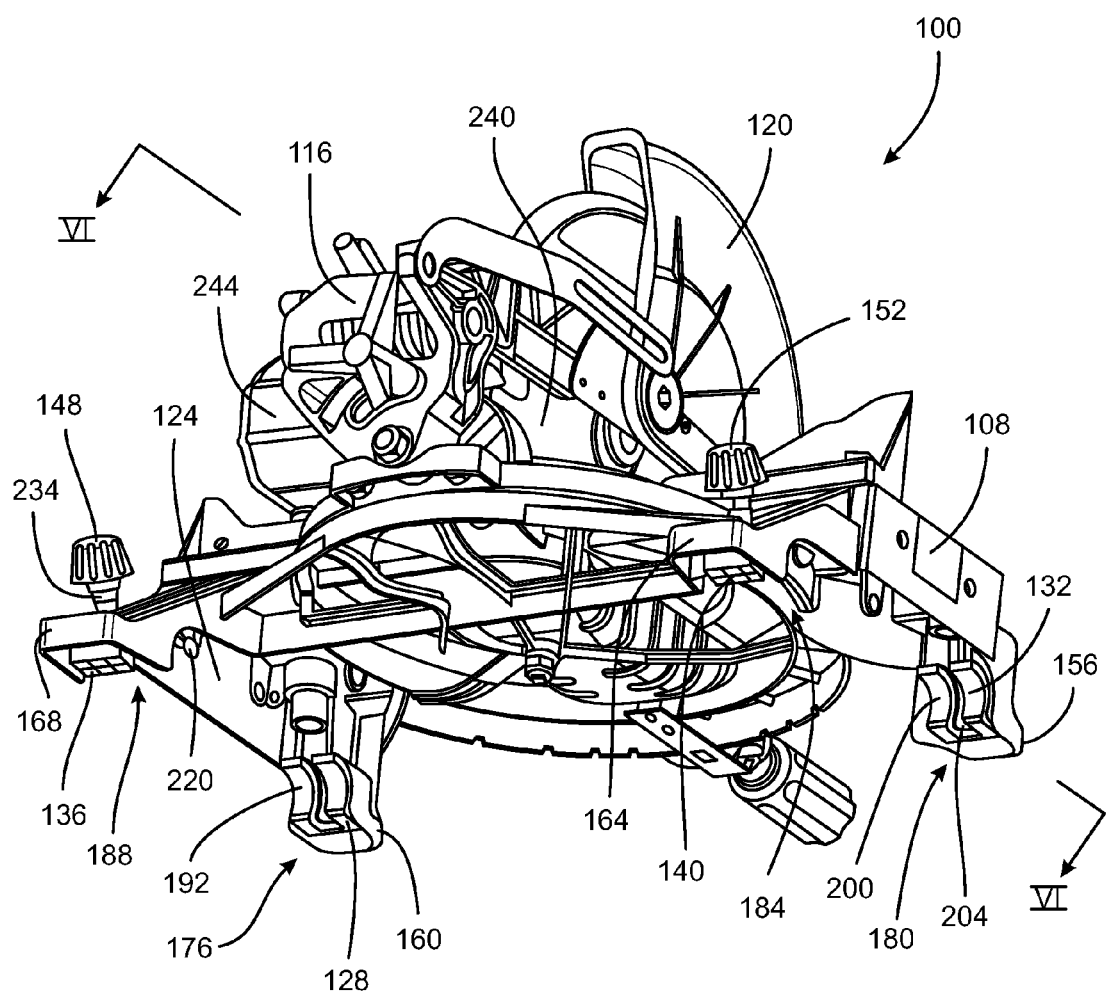
FIG. 2 is a rear perspective view showing an underside of the miter saw of FIG. 1, the miter saw stand is not shown for clarity of viewing.

FIG. 1 shows a miter saw 100 attached to a miter saw stand 104. The miter saw 100 includes a base 108, a turntable 112, a support assembly 116, and a cutting assembly 120. As shown in FIG. 2, the base 108 includes a body 124, two front mounting members 128, 132, two rear mounting members 136, 140, two springs 144 (FIG. 5), 146 (FIG. 6), and two actuators 148, 152. The body 124, which is formed from aluminum, includes two front foot structures 156, 160, two rear foot structures 164, 168, and two internally threaded bores 172 (FIG. 6, only one shown). The front foot structure 156 defines a front cavity 180, and the front foot structure 160 defines a front cavity 176. The rear foot structure 164 defines a rear cavity 184, and the rear foot structure 168 defines a rear cavity 188.

The internally threaded bore 172 (shown in FIG. 6) of the rear foot structure 164 is an opening formed in the base 108. The internally threaded bore 172 defines a fastener passage that extends into the rear cavity 184 defined by the rear foot structure 164. Although not shown in the figures, an identical internally threaded bore is formed in the rear foot structure 168 and defines a fastener passage that extends into the rear cavity 188.

Figure 3:
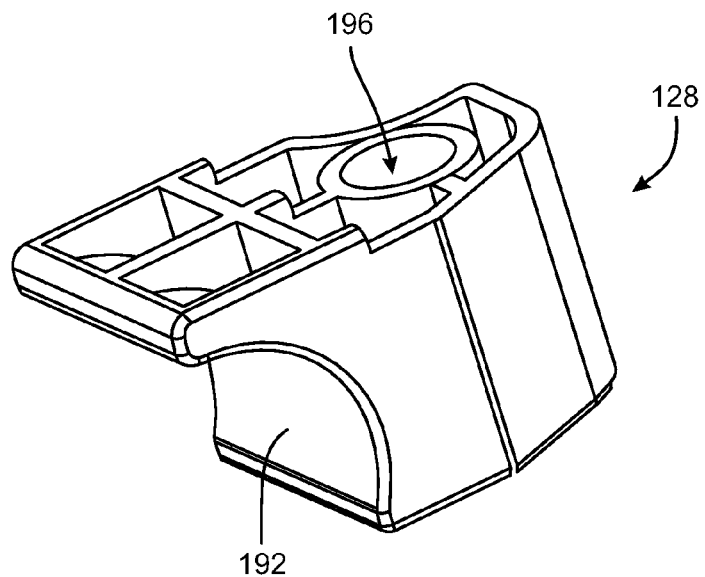
FIG. 3 is a perspective view of a front mounting member of the miter saw of FIG. 1.

As shown in FIG. 3, the front mounting member 128 is at least partially positioned in the front cavity 176 defined by the front foot structure 160. The front mounting member 128 is connected to the body 124 of the base 108 such that the position of the front mounting member is fixed in relation to the body. In particular, a fastener (not shown) extends through an opening 196 formed in the front mounting member 128 to connect the front mounting member to the body 124.

Figure 4:
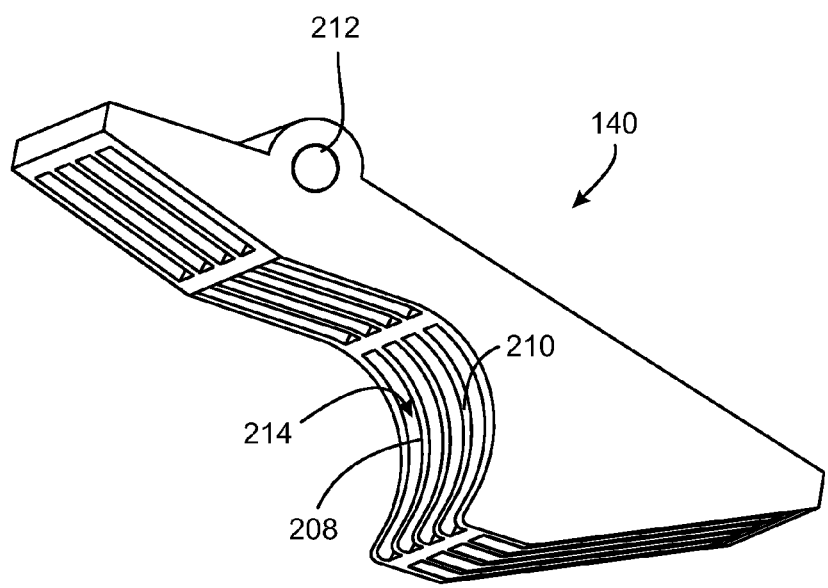
FIG. 4 is a perspective view of a rear mounting member of the miter saw of FIG. 1.

The front mounting member 128 defines a front clamping surface 192. The front clamping surface 192 includes a generally uniform curved surface. In particular, the front clamping surface has a radius that is approximately equal to a radius of a front elongated member 248 (FIG. 1) of the miter saw stand 104. The front mounting member 128 is formed from injection molded thermoplastic. In another embodiment of the front mounting member 128, the front clamping surface 192 includes a plurality of ridges and a plurality of grooves, which are substantially identical to a plurality of ridges and a plurality of grooves on a clamping surface of the rear mounting member 140 (FIG. 4). In yet another embodiment of the front mounting member 128, at least a portion of the front clamping surface 192 includes a material having a high coefficient of friction.

The front mounting member 132 (shown in FIG. 2) is identical to the front mounting member 128, nonetheless, for completeness the structure and the position of the front mounting member 132 are described. The front mounting member 132 is at least partially positioned in the cavity 180 defined by the front foot structure 156. The front mounting member 132 is connected to the body 124 of the base 108 such that the position of the front mounting member is fixed in relation to the body. In particular, a fastener (not shown) extends through an opening 204 formed in the front mounting member 132.

The front mounting member 132 defines a front clamping surface 200. The front clamping surface 200 includes a generally uniform curved surface. In particular, the front clamping surface has a radius that is approximately equal to a radius of a front elongated member 248 (FIG. 1) of the miter saw stand 104. The front mounting member 132 is formed from injection molded thermoplastic. In another embodiment of the front mounting member 132, the front clamping surface 200 includes a plurality of ridges and a plurality of grooves, which are substantially identical to a plurality of ridges and a plurality of grooves shown on a clamping surface of the rear mounting member 140 (FIG. 4). In yet another embodiment of the front mounting member 132, at least a portion of the front clamping surface 200 includes a material having a high coefficient of friction.

Figure 6:
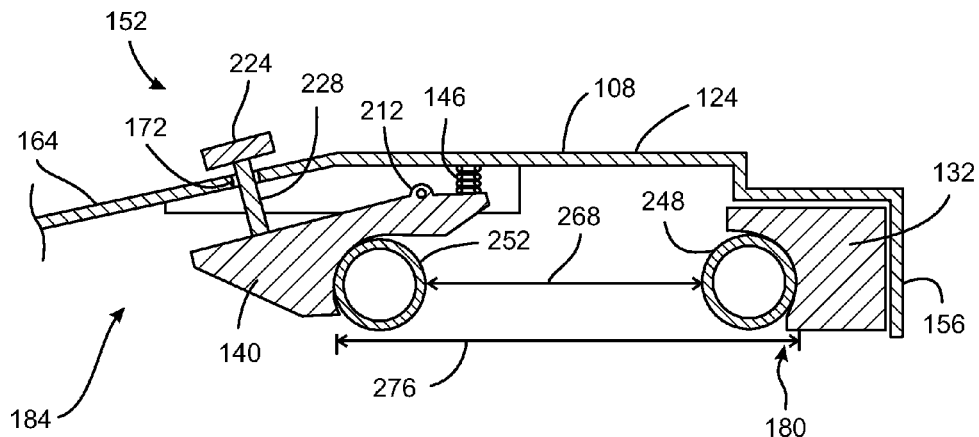
FIG. 6 is a cross sectional view taken along the line VI-VI of FIG. 2 and showing the integrated stand mount in an engaged position on a pair of elongated members of the miter saw stand of FIG. 1.
Figure 7:
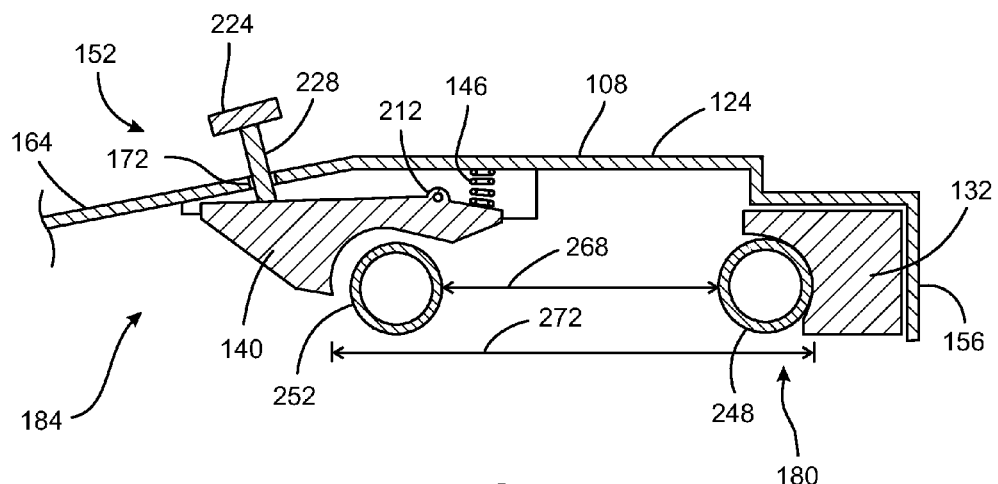
FIG. 7 is a cross sectional view taken along the line VI-VI of FIG. 2 and showing the integrated stand mount in a disengaged position on the pair of elongated members of the miter saw stand of FIG. 1.

As shown in FIG. 4, the rear mounting member 140 is at least partially positioned in the rear cavity 184 defined by the rear foot structure 164. The rear mounting member 140 is movable relative to the body 124. In particular, the rear mounting member 140 is pivotally attached to the body 124 at the pivot point 212, such that the rear mounting member is movable between a clamped position (FIG. 6) and an unclamped position (FIG. 7).

The rear mounting member 140 defines a rear clamping surface 208, which includes a plurality of ridges 210 that are separated by a plurality of grooves 214. The rear clamping surface 208 includes a curved surface, which has a radius that is approximately equal to a radius of a rear elongated member 252 (FIG. 1) of the miter saw stand 104. In another embodiment of the rear mounting member 140, the rear clamping surface 208 is uniform (i.e. the rear clamping surface does not include the ridges 210 or the grooves 214). In yet another embodiment of the rear mounting member 140, the rear clamping surface 208 includes a material having a high coefficient of friction.

Figure 5:
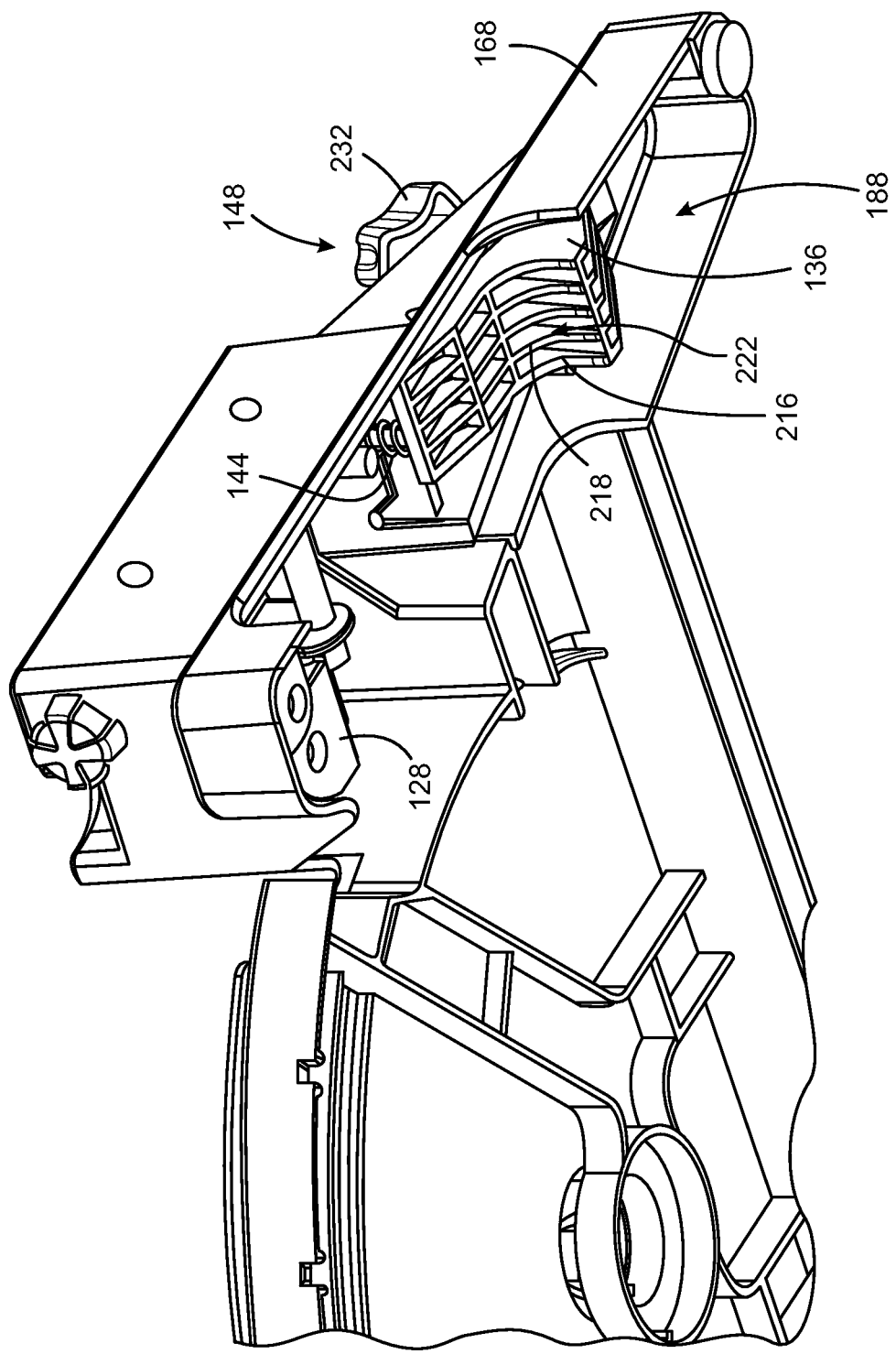
FIG. 5 is a fragmentary front perspective view showing a portion of the underside of the miter saw of FIG. 1, the miter saw stand is not shown for clarity of viewing.

As shown in FIG. 5, the rear mounting member 136 is at least partially positioned in the rear cavity 188 defined by the rear foot structure 168. The rear mounting member 136 is movable relative to the body 124. In particular, the rear mounting member 136 is pivotally attached to the body 124 at the pivot point 220 (FIG. 1), such that the rear mounting member is movable between a clamped position and an unclamped position.

The rear mounting member 136 defines a rear clamping surface 216, which includes a plurality of ridges 218 that are separated by a plurality of grooves 222. The rear clamping surface 216 includes a curved surface, which has a radius that is approximately equal to a radius of a rear elongated member 252 (FIG. 1) of the miter saw stand 104. In another embodiment of the rear mounting member 140, the rear clamping surface 216 is uniform (i.e. the rear clamping surface does not include the ridges 218 or the grooves 222). In yet another embodiment of the rear mounting member 136, the rear clamping surface 216 includes a material having a high coefficient of friction.

As shown in FIG. 5, the spring 144 is associated with the rear mounting member 136. The spring 144 is positioned to bias the rear mounting member 136 in the unclamped position and to bias the rear clamping surface 216 away from the front clamping surface 192. The spring 144 biases a portion of the rear mounting member 136 against the 148 actuator.

As shown in FIG. 6, the spring 146 is associated with the rear mounting member 140. The spring 146 is positioned to bias the rear mounting member 140 in the unclamped position and to bias the rear clamping surface 208 away from the front clamping surface 200. The spring 146 biases a portion of the rear mounting member 140 against the actuator 152.

The actuator 152 is associated with the rear mounting member 140 and includes a handle 224 and an externally threaded fastener 228. The handle 224 is connected to an end portion of the externally threaded fastener 228. The handle 224 is shaped to be comfortably grasped and rotated by the hand of a user. The externally threaded fastener 228 is meshingly engaged with the internally threaded bore 172 of the base 108. The externally threaded fastener 228 extends through the fastener passage defined by the internally threaded bore 172, such that at least a portion of the externally threaded fastener extends into the rear cavity 184 in the foot structure 164. Rotation of the handle 224 moves the actuator 152 between an engaged position (FIG. 6) and a disengaged position (FIG. 7). The actuator 152 is movable between the engaged position and the disengaged position without separate hand tools or machine assistance. The handle 224 is formed from injection molded thermoplastic, and the externally threaded fastener 228 is formed from steel.

The actuator 148 is identical to the actuator 152 and is described for completeness. The actuator 148 includes a handle 232 and an externally threaded fastener 234 (FIG. 2). The handle 232 is connected to an end portion of the externally threaded fastener 234. The externally threaded fastener 234 is meshingly engaged with the internally threaded bore defined by the rear foot section 168. The externally threaded fastener 234 extends through a fastener passage defined by the internally threaded bore, such that at least a portion of the externally threaded fastener extends into the cavity 188. Rotation of the handle 232 moves the actuator 148 between an engaged position and a disengaged position. The actuator 152 is movable between the engaged position and the disengaged position without separate hand tools or machine assistance. The handle 232 is formed from injection molded thermoplastic, and the externally threaded fastener 234 is formed from steel.

As shown in FIG. 1, the turntable 112 is rotatably supported on the base 108 and is configured for movement relative to the base. The turntable 112 includes a work piece support surface 236 on which a work piece to be cut is positioned. The turntable 112 is formed from aluminum.

The support assembly 116 is attached to the turntable 112 and functions to support the cutting assembly 120. The support assembly 116 includes components that enable the cutting assembly 120 to move upward and downward in relation to the turntable 112 in order to cut a work piece positioned on the work piece support surface 236. The support assembly 116 also typically includes components to enable the cutting assembly 120 to pivot in relation to the turntable 112 in order to produce beveled or angled cuts on the work piece.

The cutting assembly 120 is pivotally connected to the components of the support assembly 116 that are movable relative to the turntable 112. The cutting assembly 120 is positioned over the turntable 112 and the work piece support surface 236. The cutting assembly 120 includes a blade 240 and a motor assembly 244. The blade 240 is a circular saw blade. The motor assembly 244 rotates the blade 240 when the motor assembly is connected to a source of electrical power. The rotating blade 240 is configured to cut a work piece placed on the work piece support surface 236 when the cutting assembly 120 is pivoted about the pivot axis toward the turntable 112 and the base 108.

As shown in FIG. 1, the miter saw stand 104, to which the miter saw 100 is configured for attachment, includes a front elongated member 248, a rear elongated member 252, a left end plate 256, a right end plate 260, and ground engaging legs 264. A left end portion of the front elongated member 248 and a left end portion of the rear elongated member 252 are connected to the left end plate 256. A right end portion of the front elongated member 248 and a left end portion of the rear elongated member 252 are connected to the right end plate 260. As shown in FIGS. 6 and 7, the front elongated member 248 is separated from the rear elongated member 252 by a fixed distance, as represented by reference line 268. The front elongated member 248 and the rear elongated member 252 are cylindrical structures, which define an exterior surface having a uniform radius. The radius defined by the elongated members 248, 252 is approximately equal to the radius defined by the clamping surfaces 192, 200, 208, 216.

A front pair of the ground engaging legs 264 is connected near the left and the right end portions of the front elongated member 248, and a rear pair of the ground engaging legs 252 is connected near the left and the right end portions of the rear elongated member 252. The miter saw stand 104 is formed from aluminum. The miter saw stand 104 is an exemplary miter saw stand. The miter saw 100 is configured for connection to any type of miter saw stand having a front elongated member separated from a rear elongated member.

In operation, the miter saw 100 is configured for connection to the miter saw stand 104. The miter saw 100 is connected to the miter saw stand 104 with the integrated stand mount; accordingly, a separate bracket system is not used to connect the miter saw to the miter saw stand. The mounting members 128, 132, 136, 140 and the actuators 148, 152, among other components of the miter saw 100, form the integrated stand mount. The miter saw 100 is connectable and dis-connectable from the miter saw stand 104 without the use of hand tools or machine power. Additionally, the miter saw 100 weighs considerably less than the combination of a typical miter saw and a typical bracket system.

To connect the miter saw 100 to the miter saw stand 104 first the actuator 148 and the actuator 152 are moved to the disengaged position (as shown in FIG. 7) by rotating the handle 224 and the handle 232 in a counterclockwise direction. As the actuator 152 is moved to the disengaged position, the externally threaded fastener 228 is withdrawn from the rear cavity 184. Withdrawal of the externally threaded fastener 228 enables the spring 146 to pivot the rear mounting member 140 in a clockwise direction, to the position shown in FIG. 7. Pivoting of the rear mounting member 140 moves the clamping surface 208 away from the clamping surface 200, thereby increasing the length of the space defined between the clamping surface 208 and the clamping surface 200, as represented by the reference line 272. Movement of the actuator 148 to the disengaged position, positions the clamping surface 192 and the clamping surface 216 in a substantially identical manner, such that the length of the space defined between the clamping surface 192 and the clamping surface 216 is also increased to the length represented by the reference line 272.

After the actuator 148 and the actuator 152 are moved to the disengaged position, the miter saw 100 is placed on the miter saw stand 104, such that the front elongated member 248 and the rear elongated member 252 are positioned between the front mounting member 132 and the rear mounting member 140 and the front elongated member 248 and the rear elongated member 252 are positioned the front mounting member 136 and the rear mounting member 128.

Next, the actuator 148 and actuator 152 are moved the engaged position (as shown in FIG. 6) by rotating the handle 224 and the handle 232 in a clockwise direction. When the actuator 148 and the actuator 152 are in the engaged position the miter saw 100 is secured/clamped to the miter saw stand 104. Securing the miter saw 100 to the miter saw stand 104 prevents movement of the base 108 relative to the elongated members 248, 252.

As the actuator 152 is moved to the engaged position, the externally threaded fastener 228 extends to a further extent into the rear cavity 184. As the externally threaded fastener 228 extends into the rear cavity 184, the externally threaded fastener contacts the rear mounting member 140 and causes the rear mounting member to pivot in a counterclockwise direction about the pivot point 212. The pivoting of the rear mounting member 140 moves the clamping surface 208 closer to the clamping surface 200, thereby reducing the length of the space between the clamping surface 208 and the clamping surface 200, as shown by reference line 276, which is shorter than reference line 272.

Continued rotation of the actuator 152 toward the engaged position, causes the rear clamping surface 214 to contact the rear elongated member 252 and causes the front clamping surface 200 to contact the front elongated member 248. Still further rotation of the actuator 152 causes the front clamping surface 200 and the rear clamping surface 214 to apply a compressive force to the elongated members 248, 252, which fixes the position miter saw 100 relative to the elongated members. Movement of the actuator 148 to the engaged positions causes the front clamping surface 216 and the rear clamping surface 192 to apply a compressive force to the elongated members 248, 252 in a substantially identical manner. The elongated members 248, 252 are positioned in the space between the clamping surface 208 and the clamping surface 200 when actuator 152 is in the engaged position. Similarly, the elongated members 248, 252 are positioned in the space between the clamping surface 192 and the clamping surface 216 when the actuator 148 is in the engaged position.

To disconnect the miter saw 100 from the miter saw stand 104 the actuator 148 and the actuator 152 are moved to the disengaged position. When the actuator 148 is in the disengaged position (as shown in FIG. 7), the length of the space between the clamping surface 192 and the clamping surface 216 is greater than the distance between the elongated member 248 and the elongated member 252. Similarly, when the actuator 152 is in the disengaged position, the length of the space between the clamping surface 208 and the clamping surface 200 is greater than the distance between the elongated member 248 and the elongated member 252. Accordingly, when the actuator 148 and the actuator 152 are in the disengaged position, the miter saw 100 is removable from the miter saw stand 104, by lifting the miter saw in an upward direction.

It is noted that the integrated mounting system of the miter saw 100 enables the miter saw to be operated on a flat work surface, such as a table top or a floor surface. As shown in FIGS. 6 and 7, the foot structures 156, 160, 164, 168 are positioned to engage the ground when the miter saw is removed from the miter saw stand 104.

While the miter saw 100 has been illustrated and described in detail in the figures and the foregoing description, the same should be considered as illustrative and not restrictive in character. It should be understood that only the preferred embodiments have been presented and that all changes, modifications, and further application that come within the spirit of the disclosure are desired to be protected.

What is claimed is:

1. A miter saw for use with a miter saw stand, comprising:
   a base having a first mounting member that defines a first clamping surface and is movably attached to said base, a second mounting member that defines a second clamping surface and is attached in a fixed position to said base, and a first actuator, the first mounting member and the second mounting member being spaced apart horizontally with the first clamping surface and the second clamping surface arranged facing each other, the first actuator being configured to move the first mounting member between a clamped and an unclamped position in relation to said second clamping member to removably secure said base to a miter stand;
   a turntable rotatable in relation to said base and having a work piece support surface;
   a support assembly attached to said turntable; and
   a cutting assembly attached to said support assembly and positioned over said turntable,
   wherein said base includes an upper surface positioned above said first mounting member and a first bore structure that defines a first fastener passage that extends downwardly through said upper surface,
   wherein said first actuator includes a fastener that extends through said first bore structure and is connected to said first mounting member and a handle connected to an end of the fastener and positioned above the upper surface for moving the fastener within the bore structure,
   wherein said fastener of said first actuator is movable longitudinally by said handle between a first position and a second position in relation to said first bore structure,
   wherein movement of said fastener of said first actuator between said first position said second position causes said first mounting member to move between said unclamped and said clamped positions, respectively,
   wherein movement of said first mounting member between said clamped and said unclamped position causes said first clamping surface to move horizontally closer to and farther way from said second clamping surface, respectively,
   wherein said base includes foot structures that extend below the first and second mounting members, the foot structures having bottom surfaces for supporting the base on a flat work surface, and
   wherein the first mounting member, the second mounting member, and the first actuator are each located above the bottom surfaces of the foot structures in the clamped and the unclamped positions.

2. The miter saw of claim 1, wherein said first mounting member is pivotably attached to said base.

3. The miter saw of claim 1, wherein:
   said base further has a spring, and
   said spring is positioned to bias said first mounting member toward said unclamped position.

4. The miter saw of claim 1, wherein:
   said base includes (i) a first foot structure defining a first cavity, and (ii) a second foot structure defining a second cavity,
   said first mounting member is at least partially positioned within said first cavity, and
   said second mounting member is at least partially positioned within said second cavity.

5. The miter saw of claim 4, wherein:
   said first fastener is externally threaded,
   said first bore structure is internally threaded, and
   said externally threaded first fastener is meshingly engaged with said internally threaded first bore structure.

6. The miter saw of claim 5, wherein said externally threaded first fastener extends into said first cavity.

7. The miter saw of claim 1, wherein:
   said miter saw stand includes a first elongated member and a second elongated member,
   said first clamping surface and said second clamping surface define a space therebetween, and
   both said first elongated member and said second elongated member are positioned in said space when said first actuator is located at said second position.

8. The miter saw of claim 1, wherein:
   said base further has a third mounting member that defines a third clamping surface and is movably attached to said base, a fourth mounting member that defines a fourth clamping surface and is attached in a fixed position to said base, and a second actuator,
   wherein said base includes a second bore structure that defines a second fastener passage that extends through said upper surface,
   wherein said second actuator includes a second fastener that extends downwardly through said second bore structure and is connected to said second mounting member
   said second actuator is movable between a third position and a fourth position in relation to said second bore structure, and
   movement of said second actuator from said third position towards said fourth position causes said third clamping surface to move toward said fourth clamping surface.

9. The miter saw of claim 8, wherein:
   said third mounting member is pivotably attached to said base.

10. The miter saw of claim 8, wherein:
    said base further has a second spring, and
    said second spring is positioned to bias said third clamping surface away from said fourth clamping surface.

11. The miter saw of claim 8, wherein:
    said body includes a third foot structure defining a third cavity, and a fourth foot structure defining a fourth cavity,
    said third mounting member is at least partially positioned within said third cavity, and
    said fourth mounting member is at least partially positioned within said fourth cavity.

12. The miter saw of claim 8, wherein:

said second fastener is externally threaded, said second bore structure is internally threaded, and said second externally threaded fastener is meshingly engaged with said second internally threaded bore structure.

13. The miter saw of claim 12, wherein:

said second externally threaded fastener extends into said third cavity.

14. The miter saw of claim 8, wherein:

said third clamping surface and said fourth clamping surface define a second space therebetween, said first space is spaced apart from said second space, and both said first elongated member and said second elongated member are positioned in said second space when said second actuator is located at said fourth position.

* * * * *